United States Patent
Sun

(10) Patent No.: US 6,278,875 B1
(45) Date of Patent: Aug. 21, 2001

(54) METHOD FOR SETTING UP A CALL THROUGH INDIRECT ACCESS IN A MOBILE COMMUNICATION SYSTEM

(75) Inventor: Ick-young Sun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/320,973

(22) Filed: May 27, 1999

(30) Foreign Application Priority Data

Jun. 3, 1998 (KR) .................................................. 98-20510

(51) Int. Cl.[7] ........................................................ H04B 7/00
(52) U.S. Cl. ............................ 455/422; 455/436; 455/450
(58) Field of Search .................................. 455/422, 436, 455/440, 442, 445, 450, 452, 62, 63, 67.1; 370/331, 332, 335, 342

(56) References Cited

U.S. PATENT DOCUMENTS

| | | |
|---|---|---|
| 5,187,806 | 2/1993 | Johnson et al. . |
| 5,428,818 | 6/1995 | Meidan et al. . |
| 5,535,423 | 7/1996 | Dupuy . |
| 5,742,911 | 4/1998 | Dumbrill et al. . |
| 5,774,790 | 6/1998 | Dupuy . |
| 5,802,468 | 9/1998 | Gallant et al. . |
| 5,999,522 | * 12/1999 | Rohani ................................. 455/436 |
| 6,038,448 | * 3/2000 | Chheda et al. ....................... 455/436 |

* cited by examiner

Primary Examiner—Thanh Cong Le
(74) Attorney, Agent, or Firm—Dilworth & Barrese, LLP

(57) ABSTRACT

A method is provided for setting up a call through an indirect access via a base transceiver station (BTS) assigned to a service area having a plurality of sectors, each of the plurality of sectors having a characteristic identifying signal. The method includes the steps of receiving a request for a call setup from the mobile station located in a first sector of the plurality of sectors of the service area, allocating a traffic resource channel to the requested call, sequentially confirming whether a signal transmitted by the mobile station is detected in one of the plurality of sectors beginning with the first sector, and processing and maintaining a call corresponding to the call request once the signal from the mobile station is detected in one of the plurality of sectors, and determining that the requested call setup has failed if the signal from the mobile station is not detected in any of the plurality of sectors of the service area.

12 Claims, 3 Drawing Sheets

METHOD FOR SETTING UP A CALL THROUGH INDIRECT ACCESS IN A MOBILE COMMUNICATION SYSTEM

This application claims priority to an application entitled "A Method For Setting Up A Call Through Indirect Access In A Base Transceiver Station of Mobile Telecommunication System" filed in the Korean Industrial Property Office on Jun. 3, 1998 and assigned Serial No. P1998-020510, the contents of which are hereby incorporated by reference.

BACKGROUND OF THE INVENTION

1. Field of the Invention

The present invention relates generally to mobile communications, and in particular to a method for setting up a call requested by a mobile station through indirect access using a base transceiver station of a mobile telecommunication system. More particularly, the present invention relates to methods for setting up a call requested by the mobile station within a specific sector, and where the mobile station then travels to a different sector by the time the base transceiver station has initiated the call setup in a code division multiple access (CDMA) communication technique.

2. Description of the Related Art

A mobile telecommunication system using a code division multiple access (CDMA) technique comprises a plurality of cells each having a base transceiver station (BTS) for providing communication service to mobile stations, a plurality of base station controllers (BSC) for controlling a plurality of BTSs, and a mobile switching center (MSC) for connecting a plurality of BSCs to a public switched telephone network (PSTN).

In such a CDMA system, a forward link channel is a channel which is setup from a BTS toward a mobile station. A reverse link channel is a channel which is setup from a mobile station toward a BTS. Since all forward link channels within a BTS have the same PN offset, a mobile station identifies base transceiver stations with a PN offset.

The mobile telecommunication system enables multiple subscribers to set up calls at the same time by allocating different frequencies for each of the respective subscribers. To make frequency allocation more efficient, a cell division technique is generally implemented where each of the cells of the telecommunication system is divided into sectors. Typically, each cell is divided into three sectors by placing three antennas at the BTS having a 120° angle of separation.

The cell division technique is disclosed in U.S. Pat. No. 5,428,818, entitled "Method and Apparatus For Reducing Interference In A Radio Communication Link Of A Cellular Communication System", wherein the technique entails using a different antenna for each sector (geographic service area) of a cell.

When a cell division technique is implemented, each sector is assigned its own characteristic PN offset and a mobile station within the cell recognizes each sector as a BTS. When the mobile station located in a certain sector of a cell requests a call setup, the BTS tries to set up the call using information from the sector in which the mobile station is located.

With reference to FIG. 1, there is illustrated a procedure for setting up a call after having divided the cell into sectors according to the prior art. As shown, the cell is divided into three sectors, i.e., sector α 100, sector β 200, and sector γ 300. If a mobile station 2 which is located in one of the sectors, for instance, in sector γ 300, requests a call setup, a base transceiver station 1 confirms whether there is a preamble signal, i.e., a reverse traffic signal which the mobile station 2 transmits to the base transceiver station 1. A traffic channel element of the BTS 1 receives the reverse traffic signal from the mobile station 2 using information about the sector designated by the BTS 1 as having the mobile station 2 therein.

However, according to the prior art, the BTS 1 does not recognize a change of location (for example, from sector γ 300 to sector α 100) of the mobile station 2, if any, from the time the request for call setup is made to the time that the call setup is accomplished. In particular, if an idle handoff is about to occur, the mobile station 2 may be located in a first sector when it requests a call setup and in a second sector when the mobile station 2 transfers the reverse traffic signal. In such a situation, it is very difficult for the BTS 1 to receive the reverse traffic signal from the mobile station 2 using only information about the first sector, i.e., the sector where the mobile station 2 was located in when it requested the call setup.

In other words, if a mobile station requests a call setup in an original sector (orig_sector) and then moves to a sector other than the orig_sector, a BTS which has only information about the orig_sector cannot receive a reverse traffic signal from the mobile station.

FIG. 2 illustrates movement of a mobile station during a call setup according to the prior art. As shown, a mobile station 2 which is in the access state requests a call setup in a sector γ 300 and a base transceiver station (BTS) 1 receives the request for call setup, processes the call setup using information about the sector γ 300 in which the mobile station 2 is currently located, and assigns a traffic channel.

However, the mobile station 2 which has requested the call setup has already moved to sector α 100; the mobile station 2 now being designated by reference numeral 3. The prior art BTS 1 searches a reverse traffic signal of the mobile station 3 in sector γ 300 only, and terminates initiation of the call, when no reverse traffic signal is identified.

As stated above, in the case where a mobile station requests a call setup in a region where an idle handoff may occur, a base transceiver station is not able to receive a preamble transmitted from the mobile station, i.e., a reverse traffic signal, using information about the original sector only. Consequently, even though a radio environment is good, the probability of successfully completing the call requested decreases.

In order to solve these problems of the prior art, it is proposed that a mobile station re-request a call setup from the new sector. Then, the BTS would receive a new request for call setup, process the call setup and assign resources accordingly. However, to implement this methodology, the structure and design configuration of the mobile station would need to be changed in order for the mobile station to be able to determine that it has moved to a different sector and a re-request of the call setup is necessary. Accordingly, a need exists for solving the problems of the prior art without changing the structure and design configuration of the mobile station.

SUMMARY OF THE INVENTION

It is an object of the present invention to provide a method for setting up a call when a base transceiver station (BTS) which has received a request for a call setup from a mobile station within a specific sector fails to detect a reverse traffic signal of the mobile station for a predetermined time period, and then the BTS attempts to detect the reverse traffic signal in the other sectors.

It is another object of the present invention to provide a method for setting up a call by which a base transceiver station (BTS) which has received a request for a call setup from a mobile station in an original sector and within an idle handoff region detects a reverse traffic signal of the mobile station in a sector other than the original sector.

It is still an object of the present invention to provide a method for setting up a call by which a base transceiver station (BTS) processes a soft handoff without receiving a request from a mobile station to detect a reverse traffic signal of the mobile station in a sector other than an original sector of the mobile station.

It is still an object of the present invention to provide a method for setting up a call by which a base transceiver station (BTS) assigns or releases resources without receiving a request from a mobile station to detect a reverse traffic signal of the mobile station in a sector other than an original sector of the mobile station.

In accordance with a preferred embodiment of the present invention, a method for setting up a call through an indirect access via a base transceiver station (BTS) assigned to a service area having a plurality of sectors, where each of the plurality of sectors has a characteristic identifying signal is disclosed. The BTS provides mobile communication service to a mobile station within the service area. The method includes the steps of receiving a request for a call setup from the mobile station located in a first sector of the plurality of sectors of the service area, allocating a traffic resource channel to the requested call, sequentially confirming whether a signal transmitted by the mobile station is detected in one of the plurality of sectors beginning with the first sector, processing and maintaining a call corresponding to the call request once the signal from the mobile station is detected in one of the plurality of sectors, and determining that the requested call setup has failed if the signal from the mobile station is not detected in any of the plurality of sectors of the service area.

In accordance with another preferred embodiment of the present invention, a method for setting up a call through an indirect access via a base transceiver station (BTS) assigned to a service area having a plurality of sectors, each of the plurality of sectors having a characteristic identifying signal is disclosed. The BTS provides mobile communication service to a mobile station within the service area. The method includes the steps of receiving a request for a call setup from the mobile station located in a first sector of the plurality of sectors of the service area, determining whether the received request was transmitted by the mobile station while in an idle handoff region defined as a region where an idle handoff may occur, and confirming whether there is a signal in the first sector which has been transmitted by the mobile station. If it is determined that the mobile station did not request the call setup in the idle handoff region, the method provides for sequentially confirming whether the signal transmitted by the mobile station is detected in one of the plurality of sectors other than the first sector, and if the mobile station requested the call setup in the idle handoff region, processing a call corresponding to the call request in the sector where the signal is detected.

DETAILED DESCRIPTION OF THE INVENTION

Preferred embodiments of the present invention will now be described herein below with reference to the accompanying drawings. In the following description, well known functions or constructions are not described in detail since they would obscure the invention in unnecessary details.

The present invention provides methods for setting up a call following a call request transmitted by a mobile station to a base transceiver station (BTS) when the BTS fails to detect a preamble signal, i.e., a reverse traffic signal of the mobile station located in a certain sector of a cell for a predetermined period of time. In accordance with the present invention, the BTS automatically searches for the reverse traffic signal in other sectors of the cell. Therefore, the present invention enables the BTS to detect the reverse traffic signal of the mobile station even though the mobile station moves outside the original sector (orig_sector) to other sectors of the cell.

In other words, when the BTS has an indirect access to the reverse traffic signal of the mobile station in a sector other than the orig_sector during a setup call procedure, the BTS performs a soft handoff and assigns radio resources to the other sector even if a request to do so is not made by the mobile station.

Figure 1:
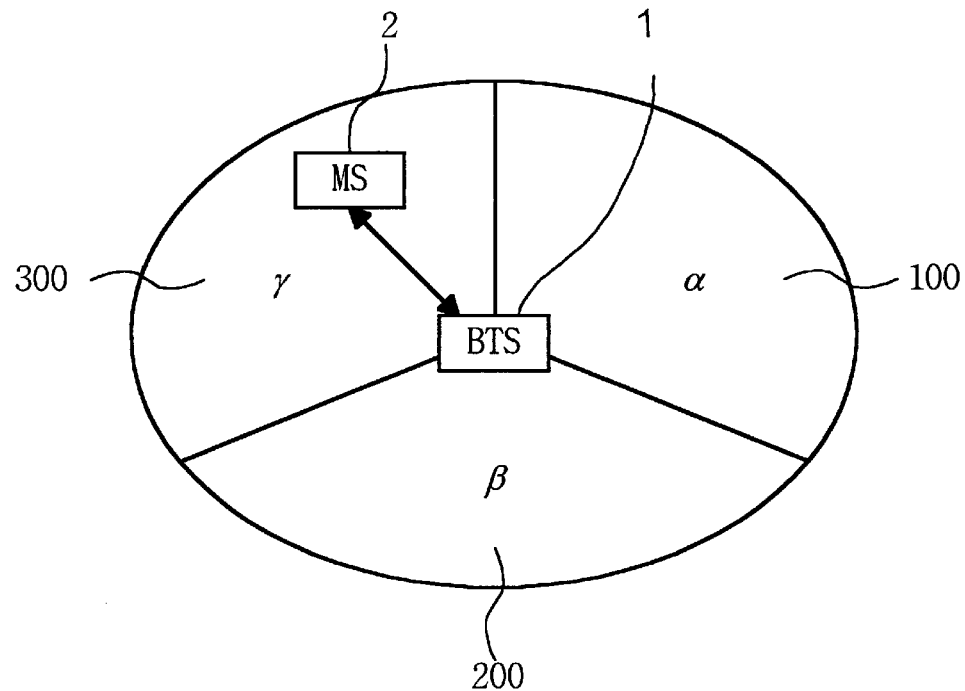
FIG. 1 is a diagram illustrating a procedure for setting up a call in a particular sector of a cell according to the prior art.
Figure 2:
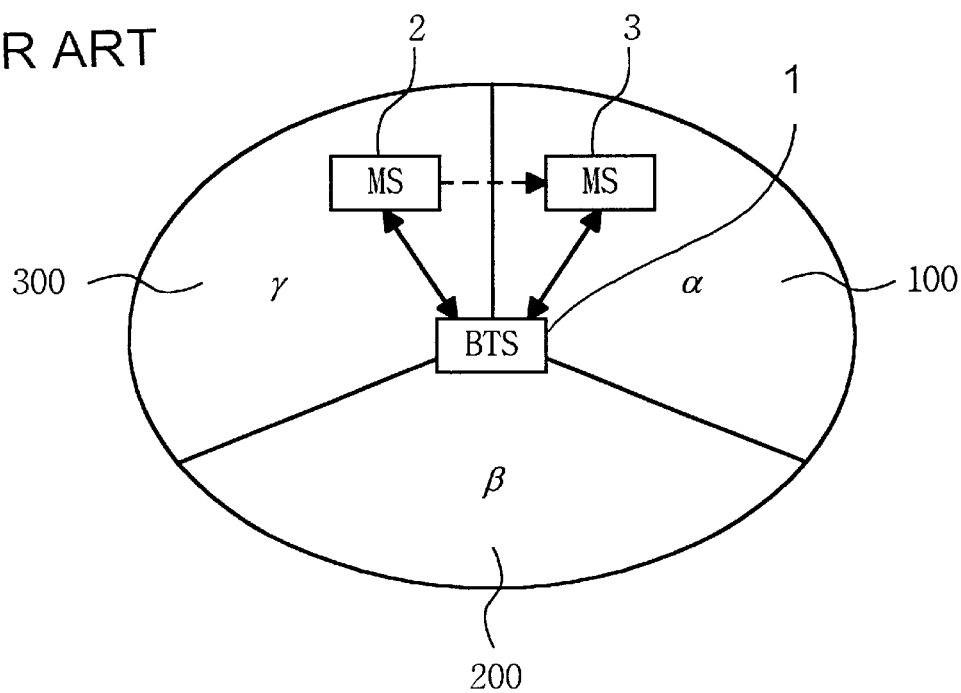
FIG. 2 is a diagram illustrating a procedure for setting up a call after movement of a mobile station from one sector of a cell to another according to the prior art.
Figure 3:
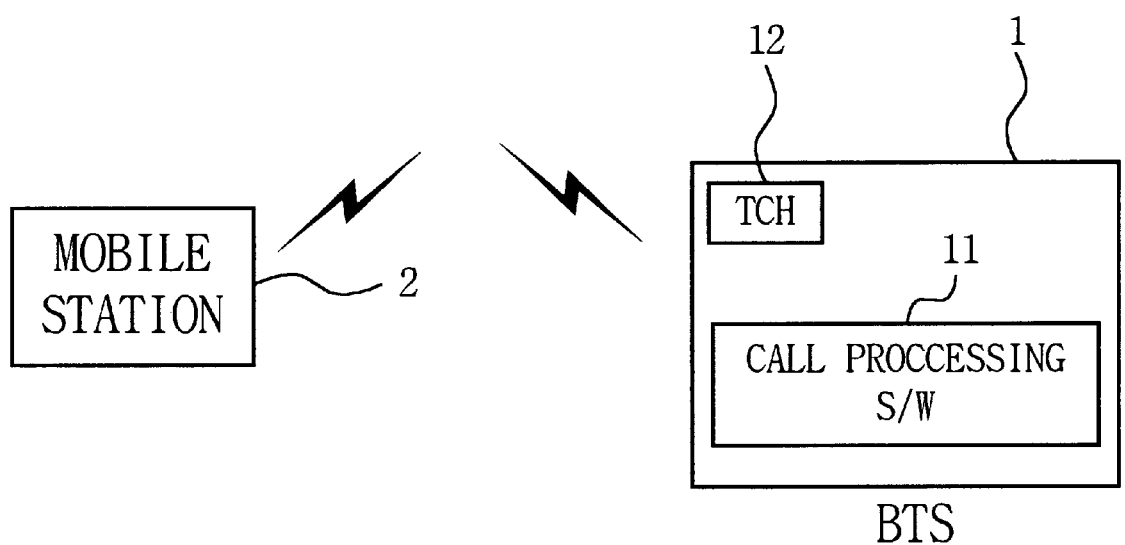
FIG. 3 is a diagram illustrating a mobile station and a base transceiver station performing a call setup procedure according to the present invention.

With reference to FIG. 3, there is illustrated a design structure of a mobile station and a base transceiver station 1 (BTS) for performing the methods of the present invention which entail setting up a call when the BTS 1 does not have a direct access to a reverse traffic signal of a mobile station 2 within a cell. The BTS 1 includes a call processing software block 11 for controlling a call with the mobile station 2 and a traffic channel element (TCH) 12 for detecting the reverse traffic signal of the mobile station 2. For convenience in describing the methods of the present invention, only one mobile station is provided within the cell. However, it is contemplated that the methods of the present invention can be practiced with more than one mobile station within the cell.

Typically, the BTS 1 is a system that is capable of providing mobile communication service between a user of the mobile station 2 and another party. When the mobile station 2 is located in a region where an idle handoff occurs, the call processing software block 11 of the BTS 1 automatically begins to detect the reverse traffic signal of the mobile station 2 in other sectors of the cell, and performs resource allocation and cancellation in response to the results of detection.

Based upon the results of the detection, the call processing software block 11 requests the TCH 12 to allocate an appropriate traffic channel to be a reverse traffic channel for the mobile station 2 which requested the call setup. If the TCH 12 responds to the request for channel allocation by the call processing software block 11, the call processing software block 11 then informs the mobile station 2 of the traffic channel allocation. The mobile station 2 then transfers the reverse traffic signal via the allocated reverse traffic channel and the TCH 12 confirms that the reverse traffic signal has been transferred from the mobile station 2 to the BTS 1.

In the situation where the reverse traffic signal is detected in a sector other than the orig_sector, i.e., the sector from where the mobile station 2 requested the call setup, the TCH 12 informs the call processing block 11 of the sector in which the reverse traffic signal is detected, thereby enabling the call processing software block 11 to take the appropriate action. Accordingly, the methods of the present invention make it possible to perform a call set up or maintain a call even when the mobile station 2 is moving between sectors of the cell, since the BTS 1 is capable of indirectly accessing the reverse traffic signal in sectors other than the orig_sector.

Figure 4:
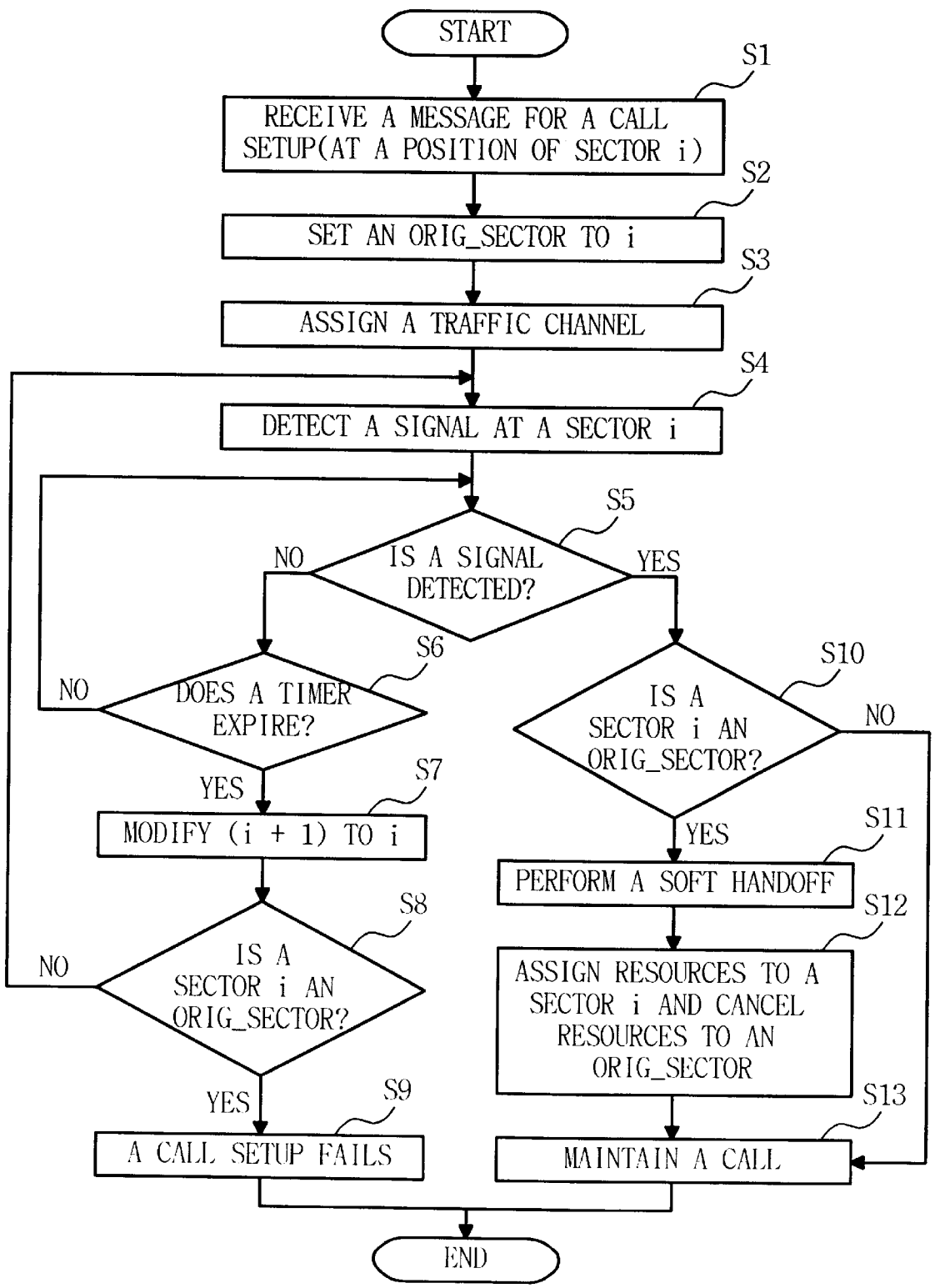
FIG. 4 is a flow chart illustrating a method for setting up a call according to the present invention.

With reference to FIG. 4, there is shown a flow chart of a method of setting up a call according to the present invention. If "i" is defined as an integer identifying the sector in which the mobile station 2 requests the call setup, the BTS 1 receives a call setup request message from sector i (Step 1). The sector identifier, "i", is greater than or equal to 0 and less than a maximum number of sectors (0≦i>maximum number of sectors). For instance, if the BTS 1 manages three sectors, then i is greater than or equal to 0 and less than 3.

After being requested to set up a call from the mobile station 2, the BTS 1 sets sector i to orig_sector (Step 2), and allocates a traffic resource channel for the corresponding call to sector i (Step 3). Then, the BTS 1 starts to detect the reverse traffic signal of the mobile station 2 in sector i, i.e., orig_sector (Step 4). The traffic channel element 12 of the BTS 1 determines whether or not the reverse traffic signal of the mobile station 2 is detected (Step 5) and if not, determines whether or not a predetermined period of time, i.e., a detection time limit, has expired (Step 6).

If the signal of the mobile station 2 is not detected after the predetermined period of time, "i" is changed to identify the next sector, and the BTS 1 begins to detect the reverse traffic signal in the next sector (Step 7). Steps S4 through S8 are performed to sequentially confirm whether the signal is in any sector. If the signal of the mobile station 2 is not detected in any of the sectors (Step 8), the call setup is deemed to have failed (Step 9). Therefore, the call is automatically canceled because the mobile station 2 was not detected in any sector of the cell.

If at step 5, the signal of the mobile station 2 is detected in a certain sector i, the BTS 1 identifies whether or not sector i is the orig_sector in which the mobile station 2 originally requested the call setup (Step 10). However, if sector i is not the orig_sector, the BTS 1 determines that the mobile station 2 is located in an idle handoff region, requests a handoff of a base station controller (BSC) and has a soft handoff procedure performed (Step 11). In response to the soft handoff procedure, the BTS 1 cancels resources to orig_sector and allocates traffic resources to sector i where the signal is detected (Step 12), and the call is maintained (Step 13).

In the situation where orig_sector and the sector where the reverse traffic signal of the mobile station 2 is detected are different, the BTS 1 automatically performs a soft handoff from one sector to the other without waiting for a soft handoff request from the mobile station 2.

If the signal of the mobile station 2 is detected in orig_sector (Step 10) or a sector where a traffic resource was reassigned after signal detection (Steps 11 to 12), a call is maintained (Step 13). Therefore, the reassigned traffic resource, i.e., traffic channel, is sustained and the BTS 1 and the mobile station 2 communicate via the traffic channel.

The call processing software block 11 and the TCH 12 of the BTS 1 share information about each sector to have resources adequately managed. They share information about traffic channels allocated to each sector. In part, the detection of the reverse traffic signal of the mobile station 2 in a sector other than orig_sector is due to the BTS's management of multi-sectors and which resources are allocated to which sector and mobile stations.

Hence, in one embodiment, the present invention provides a method, in a situation where a request for a call setup from a mobile station located in an idle handoff area is made, for detecting a reverse traffic signal of the mobile station. Further, an efficient method for managing resources is provided and ultimately system reliability is obtained and speech quality is enhanced.

Also, while a mobile station cannot transmit a pilot signal measurement message (PSSM) for handoff in order to complete a call setup, a BTS automatically recognizes a position where the mobile station is currently located and then, performs the handoff by itself without waiting for a request from the mobile station according to another embodiment of the present invention. The PSSM is transmitted via a channel from the mobile station to report on the strength of a pilot signal of a neighboring BTS. If the strength of the pilot signal from the neighboring BTS exceeds a specific level, the mobile station then transmits to the BSC the PSSM indicating the strength of the pilot signal. The BSC then determines using the PSMM whether the mobile station requires a handoff.

While the invention is susceptible to various modification and alternative forms, specific embodiments thereof have been shown by way of example in the drawings and detailed description. It should be understood, however, that the present invention is not limited to the particular forms disclosed, but on the contrary, the intention is to cover all modifications, equivalents, and alternatives falling within the spirit and scope of the invention as defined by the appended claims.

What is claimed is:

1. A method for setting up a call through an indirect access via a base transceiver station (BTS) assigned to a service area having a plurality of sectors, each of the plurality of sectors having a characteristic identifying signal, the BTS being capable of providing mobile communication service to a mobile station within the service area, the method comprising the steps of:

receiving a request for a call setup from the mobile station located in a first sector of the plurality of sectors of the service area;

allocating a traffic resource channel to the requested call;

sequentially conforming whether a signal transmitted by the mobile station is detected in one of the plurality of sectors beginning with the first sector; and processing and maintaining a call corresponding to the call request once the signal from the mobile station is detected in one of the plurality of sectors.

2. The method as set forth in claim 1, further comprising the steps of:

determining that the requested call setup has failed if the signal from the mobile station is not detected in any of the plurality of sectors of the service area; and terminating the call.

3. The method as set forth in claim 1, wherein the signal transmitted by the mobile station is a reverse traffic signal.

4. The method as set forth in claim 1, wherein said step of processing and maintaining the call corresponding to the call request further comprises the step of performing at the BTS a soft handoff operation from the first sector to a new sector of the plurality of sectors without receiving a handoff request from the mobile station.

5. The method as set forth in claim 4, wherein said step of performing a soft handoff operation further comprises the steps of:

allocating resources to the new sector; and canceling resources allocated to the first sector.

6. The method as set forth in claim 1, wherein the step of sequentially confirming whether the signal from the mobile station is detected in one of the plurality of sectors beginning with the first sector includes the step of sequentially detecting if the signal from the mobile station is detected in each of the plurality of sectors for a predetermined period of time before proceeding to a following sector if the signal is not detected.

7. A method for setting up a call through an indirect access in a base transceiver station (BTS) assigned to a service area having a plurality of sectors, each of the plurality of sectors having a characteristic identifying signal, the BTS being capable of providing mobile communication service to a mobile station within the service area, the method comprising the steps of:

receiving a request for a call setup from the mobile station located in a first sector of the plurality of sectors of the service area;

determining whether the received request was transmitted by the mobile station while in an idle handoff region;

confirming whether there is a signal in the first sector which has been transmitted by the mobile station, if it is determined that the mobile station did not request the call setup in the idle handoff region;

sequentially confirming whether the signal transmitted by the mobile station is detected in one of the plurality of sectors other than the first sector, if the mobile station requested the call setup in the idle handoff region; and processing a call corresponding to the call request in the sector where the signal transmitted by the mobile station is detected.

8. The method as set forth in claim 7, wherein said step of processing the call corresponding to the call request comprises the step of performing a soft handoff operation to handoff the mobile station from the first sector to the sector where the signal transmitted by the mobile station is detected, if the mobile station requested the call setup in the idle handoff region.

9. The method as set forth in claim 8, said step of processing the call further comprises the steps of:

canceling resources allocated to the first sector; and allocating resources to the sector where the signal transmitted by the mobile station is detected.

10. The method as set forth in claim 9, wherein the steps of canceling and allocating resources are executed by a call processing software block of the BTS.

11. The method as set forth in claim 10, wherein the step of sequentially confirming whether the signal transmitted by the mobile station is detected in one of the plurality of sectors other than the first sector is performed by a traffic channel element of the BTS.

12. The method as set forth in claim 7, wherein the signal transmitted by the mobile station is a reverse traffic signal.

* * * * *